United States Patent
Steiner et al.

(10) Patent No.: US 9,432,321 B2
(45) Date of Patent: Aug. 30, 2016

(54) METHOD AND APPARATUS FOR MESSAGING IN THE CLOUD

(75) Inventors: Moritz M. Steiner, Montclair, NJ (US); Thomas L. Wood, Colts Neck, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 618 days.

(21) Appl. No.: 13/329,357

(22) Filed: Dec. 19, 2011

(65) Prior Publication Data

US 2013/0159374 A1 Jun. 20, 2013

(51) Int. Cl.
*H04L 12/58* (2006.01)
*H04L 29/06* (2006.01)
*H04L 29/08* (2006.01)

(52) U.S. Cl.
CPC ........... *H04L 51/16* (2013.01); *H04L 65/1066* (2013.01); *H04L 65/1086* (2013.01); *H04L 65/4007* (2013.01); *H04L 67/14* (2013.01); *H04L 67/142* (2013.01); *H04L 67/148* (2013.01)

(58) Field of Classification Search
CPC ............... H04L 67/1027; H04L 29/06027; H04L 29/06; H04L 41/12; H04L 41/50; H04L 63/0823; H04L 63/14; H04L 65/4076; H04L 67/28; H04L 51/16; H04L 65/1066; H04L 65/1086; H04L 65/4007; H04L 67/14; H04L 67/142; H04L 67/148; G06F 17/30289; G06Q 10/063114; G06Q 10/107; H04W 36/0066
USPC ................................................ 709/226, 228
See application file for complete search history.

(56) References Cited

U.S. PATENT DOCUMENTS

| | | | |
|---|---|---|---|
| 7,111,162 B1* | 9/2006 | Bagepalli et al. | 713/151 |
| 2004/0030770 A1 | 2/2004 | Pandya | |
| 2004/0267920 A1* | 12/2004 | Hydrie et al. | 709/223 |
| 2004/0268357 A1* | 12/2004 | Joy et al. | 718/105 |
| 2004/0268358 A1* | 12/2004 | Darling et al. | 718/105 |
| 2005/0010754 A1* | 1/2005 | Brendel | 713/153 |
| 2005/0038905 A1* | 2/2005 | Banes | H04L 29/06 709/238 |

(Continued)

FOREIGN PATENT DOCUMENTS

| | | |
|---|---|---|
| EP | 1 705 562 A1 | 9/2006 |
| JP | H09223095 | 8/1997 |

(Continued)

OTHER PUBLICATIONS

Madhubabu Brahmanapally, et. al., "Internet-Draft—Megaco/H. 248 Call Flow Examples," Internet Engineering Task Force, Copyright (c) The Internet Society, Nov. 12, 2004, pp. 1-295.

(Continued)

*Primary Examiner* — Le H Luu
(74) *Attorney, Agent, or Firm* — C. Bilicska

(57) ABSTRACT

The distributed message handling system is created by using session states to represent the plurality of session contexts in the message handling system. The session states are flat representations of the session context which completely describe the session. Utilizing the session states to handle system message requests allows the message handling system to distribute the handling of the message requests to a plurality of state machines. Advantageously, the distributed messaging system allows the message handling system to dynamically allocate message handling resources to application instances based on demand. Such dynamic allocation allows providers to efficiently allocate resources to meet demand while meeting application execution demands.

21 Claims, 11 Drawing Sheets

(56) References Cited

U.S. PATENT DOCUMENTS

| | | | |
|---|---|---|---|
| 2005/0261985 A1* | 11/2005 | Miller et al. ............... | 705/26 |
| 2006/0031523 A1 | 2/2006 | Morris | |
| 2006/0187838 A1* | 8/2006 | Alex et al. ................. | 370/235 |
| 2006/0277596 A1* | 12/2006 | Calvert et al. ............... | 726/3 |
| 2007/0116224 A1* | 5/2007 | Burke ............... | H04L 29/06027 |
| | | | 379/201.12 |
| 2007/0156869 A1* | 7/2007 | Galchev et al. ............. | 709/223 |
| 2008/0209438 A1 | 8/2008 | Jackson et al. | |
| 2010/0149966 A1* | 6/2010 | Achlioptas et al. .......... | 370/217 |
| 2010/0241479 A1* | 9/2010 | Chaushev ...... | G06Q 10/063114 |
| | | | 705/7.15 |
| 2010/0318570 A1* | 12/2010 | Narasinghanallur ...................... | |
| | | | G06F 17/30289 |
| | | | 707/783 |
| 2010/0322163 A1* | 12/2010 | Bhalla ............... | H04W 36/0066 |
| | | | 370/329 |
| 2011/0235508 A1* | 9/2011 | Goel et al. ................... | 370/230 |
| 2012/0079099 A1* | 3/2012 | Dhara ................. | G06Q 10/107 |
| | | | 709/224 |
| 2012/0099571 A1* | 4/2012 | Staykoff ................. | H04L 41/50 |
| | | | 370/338 |
| 2012/0218970 A1* | 8/2012 | Westberg ................ | H04L 67/28 |
| | | | 370/331 |
| 2012/0254997 A1* | 10/2012 | Norrman ................. | H04L 63/14 |
| | | | 726/22 |
| 2012/0284296 A1* | 11/2012 | Arifuddin et al. ............ | 707/769 |
| 2012/0300639 A1* | 11/2012 | Janakiraman ........... | H04L 41/12 |
| | | | 370/241 |
| 2013/0111549 A1* | 5/2013 | Sowatskey .......... | H04L 63/0823 |
| | | | 726/3 |
| 2014/0032634 A1* | 1/2014 | Pimmel ............... | H04L 65/4076 |
| | | | 709/203 |

FOREIGN PATENT DOCUMENTS

| | | |
|---|---|---|
| JP | 2001060155 | 3/2001 |
| JP | 2003338839 | 11/2003 |
| WO | 02/067602 A1 | 8/2002 |
| WO | PCT/US2012/061796 | 3/2013 |

OTHER PUBLICATIONS

Giuseppe Decandia et al: "Dynamo: Amazon's Highly Available Key-value Store", Symposium on Operating Systems Principles, Oct. 14, 2007, pp. 205-220, XP007912296, ISBN: 978-1-59593-591-5.

* cited by examiner

FIG. 6

```
(1)   MEGACO/1 [216.33.33.61]: 27000
(2)     Transaction=1236 {
(3)       Context=$ {
(4)         Add=TermA {
(5)                    }
(6)         Add=$ {
(7)           Media {
(8)                  {
(9)             LocalControl {
(10)              Mode=Receiveonly,
(11)            },
(12)            Local {
(13)              v=0
(14)              c=IN IP4 $
(15)              m=audio $ RTP/AVP 4
(16)            }
(17)          }
(18)        }
(19)      }
(20)    }
```

FIG. 7

(21) MEGACO/1 [209.110.59.34]: 25000
(22)    Reply=1236 {
(23)       Context=1 {
(24)          Add=TermA,
(25)          Add=EphA{
(26)             Media {
(27)                Local {
(28)    v=0
(29)    o=- 2890844526 2890842807 IN IP4 209.110.59.34
(30)    s=-
(31)    t= 00
(32)    c=IN IP4 209.110.59.33
(33)    m=audio 30000 RTP/AVP 4
(34)    a=recvonly
(35)                } ; RTP profile for G.723 IS 4
(36)             }
(37)          }
(38)       }
(39)    }
(40) }

*FIG. 8*

```
(1)   | C4:NTFY(1)Cxt: 4 NVL:
(2)           "StatusList" , "0.1"
(3)           "ProtoString" , "MGCP"
(4)           "ServiceChangeMsgTID.01" , "ROOT"
(5)           "ServiceChangeMethodType.0.1" , "3"
(6)           . . .
(7)           "TimerVal" , "1"
(8)           "DialedString" , "5550231"
(9)           "nobody" , "nothing"
(10)          "TrunkServiceClass" , "IPDCPool"
(11)          "PeerIsSIP" , "yes"
(12)          "Request" , "RINGING_HERE"
(13)  . . .
(14)          "OkSDP" , "v=0
(15)  o=CiscoSystemsSIP-IPPhone-UserAgent 14492 17364 IN IP4 135.112.125.23
(16)  s=SIP CALL
(17)  c=IN IP4 135.112.125.23
(18)  t=0 0
(19)  m=audio 28244 RTP/AVP 0
(20)  a=rtpmap:0 PCMU/8000
(21)  "
(22)          "SENT.SDP" , "v=0
(23)  o=CiscoSystemsSIP-IPPhone-UserAgent 14492 17364 IN IP4 135.112.125.23
(24)  s=SIP CALL
(25)  c=IN IP4 135.112.125.23
(26)  t=0 0
(27)  m=audio 28244 RTP/AVP 0
(28)  a=rtpmap:0 PCMU/8000
(29)  "
(26)  . . .
(27)  now doing context: 4
```

METHOD AND APPARATUS FOR MESSAGING IN THE CLOUD

TECHNICAL FIELD

The invention relates generally to methods and apparatus for servicing messages in a network.

BACKGROUND

This section introduces aspects that may be helpful in facilitating a better understanding of the inventions. Accordingly, the statements of this section are to be read in this light and are not to be understood as admissions about what is in the prior art or what is not in the prior art.

In some known systems, network providers employ dedicated equipment to service offered applications. In these cases, if the provider wants to provide a new service, they need to estimate the future maximum demand and buy the right amount of specialized and dedicated boxes to meet the estimated demand. Later on, if the demand increases the operator needs to buy more boxes, if the demand estimate was too high, the boxes are idling. All this processes are rather slow, in the order of months, not minutes. In such a setup network providers are reluctant to make investments.

In other known systems, content providers put their applications on conventional cloud networks in order to dynamically adjust resources dedicated to their applications. However, conventional cloud networks may not meet the execution demands of a network provider application.

SUMMARY

Various embodiments provide a method and apparatus of creating a distributed message handling system. The distributed message handling system is created by using session states to represent the plurality of session contexts in the message handling system. The session states are flat representations of the session context which completely describe the session. Utilizing the session states to handle system message requests allows the message handling system to distribute the handling of the message requests to a plurality of state machines. Advantageously, the distributed messaging system allows the message handling system to dynamically allocate message handling resources to application instances based on demand. Such dynamic allocation allows providers to efficiently allocate resources to meet demand while meeting application execution demands.

In one embodiment, a distributed message handling apparatus is provided for handling messages in a distributed messaging system. The distributed message handling apparatus includes a data storage, and a processor communicatively coupled to the data storage. The processor is programmed to retrieve a session state based on a session id of a received message, create a session context based on the session state, and execute the session context using a state machine.

In some embodiments, the session state comprises a session id, a plurality of session parameters and a current node identifier.

In some embodiments, at least a portion of the session parameters are formatted as name-value pairs.

In some embodiments, the processor is also programmed to retrieve a second session state based on a second session id of a received message and recreate a sequence of messages for the second session id based on the second session state and a flow definition.

In some embodiments, the execution of the session context includes programming the processor to create an updated session state based on the executed session context.

In some embodiments, the data storage includes the updated session state associated with the state machine and a secondary session state associated with a second state machine of a second distributed message handling apparatus.

In some embodiments, the processor is also programmed to: transmit the updated session state to the second distributed message handling apparatus and receive the secondary session state from the second distributed message handling apparatus.

In a second embodiment, a distributed message handling apparatus is provided for handling messages in a distributed messaging system. The distributed message handling apparatus includes a data storage and a processor coupled to the data storage. The data storage includes a session data store. The processor is programmed to: receive a plurality of messages, forward at least a first message of the messages to a second distributed message handling apparatus in the distributed message handling system, and process at least a second message of the messages. The process includes programming the processor to: retrieve a session state from the session data store based on the second message, create a session context based on the session state, execute the session context using a state machine, create an updated session state based on the executed session context, and store the updated session state in the data storage.

In some embodiments, the session state comprises a session id, a plurality of session parameters and a current node identifier.

In some embodiments, the creation of the session context includes programming the processor to extract at least one event parameter from the received message and basing the session context on the extracted event parameter(s).

In some embodiments, at least the first message and the second message include a session id.

In some embodiments, the processor is also programmed to: determine whether the session data store contains session state information for the message based on the session id and to base the determination of whether to forward or process a message based on the determination of whether the session data store contains session state information for the message.

In some embodiments, the processor is also programmed to start the state machine in response to determining to process the second message.

In some embodiments, the processor is also programmed to: receive a migrated session state from a third distributed message handling apparatus in the distributed message handling system, and update the session data store based on the migrated session state.

In some embodiments, the state machine comprises a flow definition.

In a third embodiment, a method is provided for handling a received message in a distributed message handling system. The method includes retrieving a session state based on a session id of the received message, creating a session context based on the session state, and executing the session context using a state machine.

In some embodiments, the translation creation of the session context includes translating an updated session state using an updated session context created by the state machine and transmitting the updated session state to a session data store.

In some embodiments, the session state comprises a session id, a plurality of session parameters and a current node identifier.

In some embodiments, the creation of the session context includes extracting at least one event parameter from the received message and basing the session context on the extracted event parameter(s).

BRIEF DESCRIPTION OF THE DRAWINGS

Various embodiments are illustrated in the accompanying drawings, in which:

FIG. 6 illustrates one embodiment of message 410-1 of FIG. 4;

FIG. 7 illustrates one embodiment of messages 410-2 of FIG. 4;

FIG. 8 illustrates one embodiment of session state retrieved in step 320 of FIG. 3 and in step 530 of FIG. 5;

To facilitate understanding, identical reference numerals have been used to designate elements having substantially the same or similar structure and/or substantially the same or similar function.

DETAILED DESCRIPTION OF ILLUSTRATIVE EMBODIMENTS

The distributed message handling system is created by using session states to represent the plurality of session contexts in the message handling system. The session states are flat representations of the session context which completely describe the session. Utilizing the session states to handle system message requests allows the message handling system to distribute the handling of the message requests to a plurality of state machines. Advantageously, the distributed messaging system allows the message handling system to dynamically allocate message handling resources to application instances based on demand. Such dynamic allocation allows providers to efficiently allocate message handling services across a multitude of resources to meet demand using commodity hardware.

Advantageously, a distributed message handling system may allow for robust failover mechanisms that allow a portion of the resources to fail without affecting the function and availability of the application as a whole. Additionally, a distributed message handling system may grow or shrink, i.e. extend itself to more resources or release resources, with the growth of user. Finally, a distributed message handling system may match an application's timing requirements through a priority allocation scheme.

Figure 1:
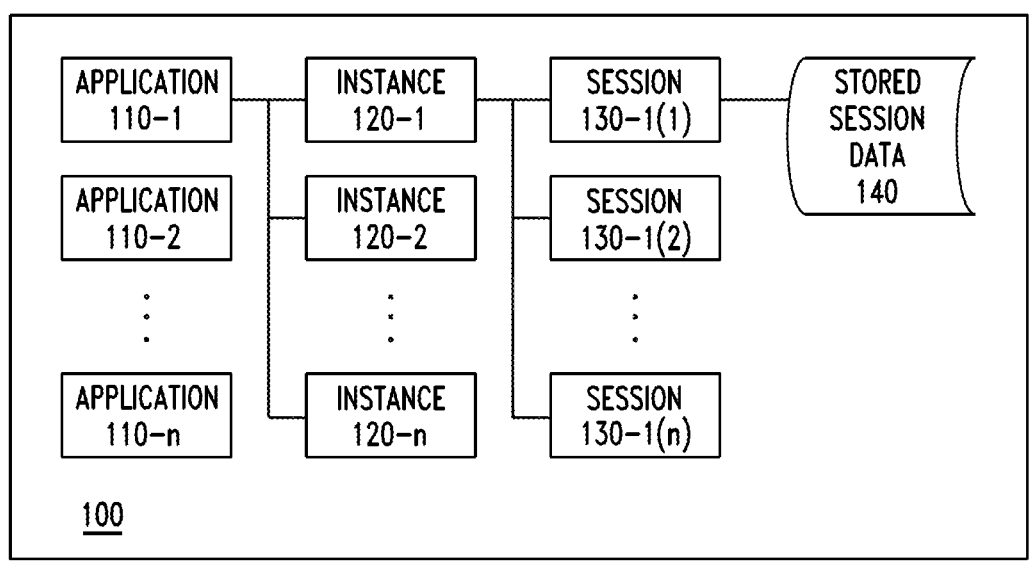
FIG. 1 depicts a hierarchy of stored session data within a distributed message handling system 100.

FIG. 1 depicts a hierarchy of stored session data within a distributed message handling system 100. A distributed message handling system 100 may handle one or more applications 110-1-110-n (collectively applications 110). Each of the applications 110 may have one or more instances 120-1-120-n (collectively instances 120). Each of the instances 120 may service messages from one or more sessions 130-1(1)-130-1(n) (collectively sessions 130). To service a message, a session requires session context data 140 related to the particular user and session.

Figure 2:
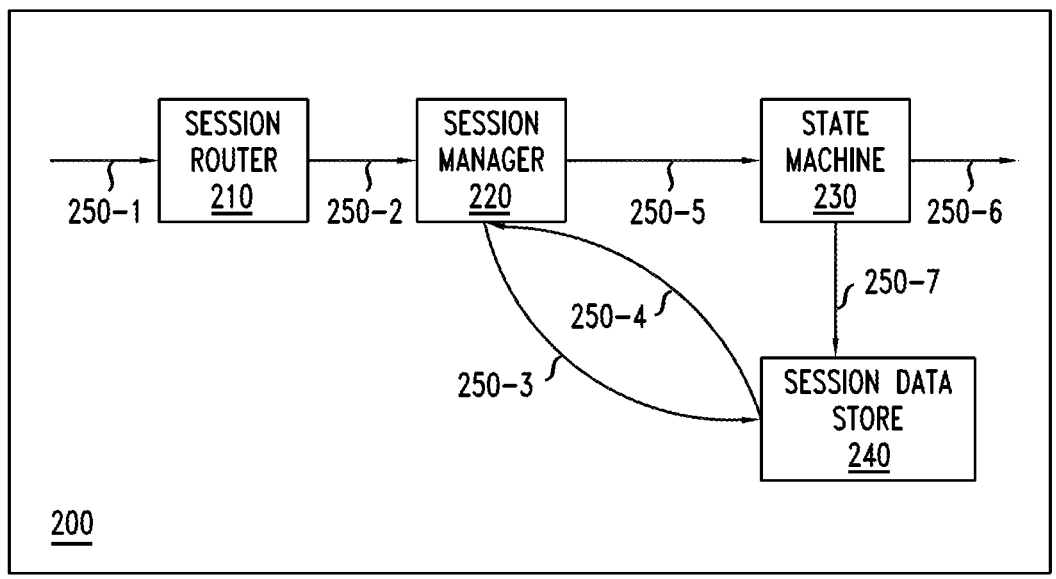
FIG. 2 depicts a functional block diagram of a distributed message handling system 200 illustrating an embodiment of a distributed message handling system 100 of FIG. 1.

FIG. 2 depicts a functional block diagram of a distributed message handling system 200 illustrating an embodiment of a distributed message handling system 100 of FIG. 1. Session Router 210 routes a message 250 received from an anchor point (not shown) to a session manager 220. Session manager 220 utilizes an identifier in the message 250 to retrieve the session state from a session data store 240. Session manager then creates a session context based on the session state and selects a state machine 230 to handle the message request. State machine 230 handles the message request and may execute a message response 250-6.

Figure 3:
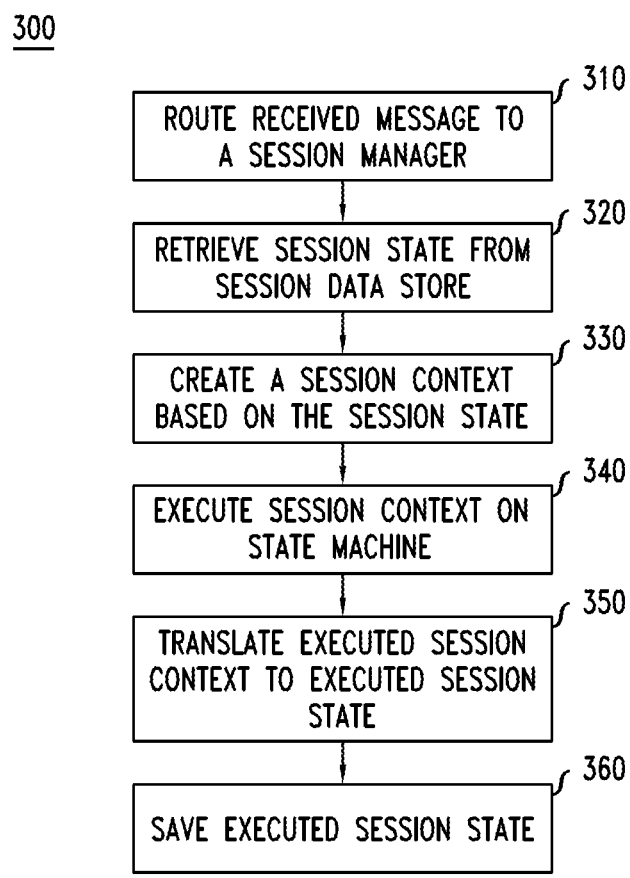
FIG. 3 depicts a flow diagram illustrating an embodiment of a method for handling a received message referring to the functional blocks of FIG. 2.

Referring to FIGS. 1-3, the session router 210 extracts the session id from the received message 250-1 and routes the message 250-2 to the session manager associated with the session id (e.g., step 310 of method 300). In particular, each message 250-1 contains a session identifier mapping the message to a session context. The session context is the persistent data describing the active session (e.g., 130-1 in FIG. 1). The term "session context" as used herein should be understood broadly as also including user context or any other persistent data required by the distributed message handling system 200 to handle the received message 250.

It should be appreciated that the session id extracted from a received message may be any portion of the message which identifies the session to which the message belongs. Moreover, it should be appreciated that the extracted session id may be mapped to any other indicator by any suitable component of distributed message handling system 100. As such, the term "session id" as used herein should be understood broadly as including both the extracted session id and any mapped identifiers utilized distributed message handling system 100 to represent the extracted session id.

The session router 210 further maps the session context to at least one session manager 220 responsible for handling messages associated with that session context. For example, the session router 210 may map the session id to the session manager 220 using a hashing algorithm, using a routing table, and/or using a next hop or nearest neighbor scheme.

The session manager 220 utilizes the session id to retrieve the session state from a session data store 240. In particular, session router 220 uses the session id as a key to a data retrieval query 250-3 (e.g., step 320 of method 300). The data retrieval query 250-3 is a data query directed to session data store 240. Session data store 240 returns the session state 250-4 associated with the session id in response to the data retrieval query 250-3.

The term "session state" as used herein is a flat representation of the session context. The session state completely describes the session context in a compact form and contains the information required to retrieve the entire session context. Advantageously, maintaining session state information (e.g., 140 in FIG. 1) instead of session context information for each session in the distributed message handling system 200 requires less storage and facilitates meeting timing requirements in the distributed system.

The session manager 220 translates the session state into a session context that describes the session associated with the message (e.g., step 330 in method 300) and passes the translated session context 250-5 to state machine 230. The session manager may sequence the messages to account for concurrency.

The state machine 230 contains the logic that runs the program executing the message (e.g., step 340 of method 300). The output of the executed program may be outputting a message or system command 250-6 or any other suitable response. If the session context is altered by the state machine, the updated session context is translated to an updated session state 250-7 (e.g., step 350 of method 300) and sent to the session state data 240 (e.g., step 360 of method 300).

It should be appreciated that a session context may be any suitable translation of the session state to a form that may be used by state machine 230 in the execution environment. Moreover, in some embodiments, the state machine 230 may accept session context in the same format as the session state. In these embodiments, the passing of the unaltered session state to the state machine 230 is the translation of the session state to session context.

The session state data 240 is the persistent store of data required by the distributed message handling system 200. In particular, session state is stored in session state data 240. Session state may be indexed by session id to facilitate data retrieval. It should be appreciated that by storing the information characterizing the sessions, e.g., session state data, in session state data 240, the same amount of resources is capable of handling more sessions. For example, since any state machine 230 is capable of picking up any session state to reconstitute the session and process incoming messages for that session, the system is not required to reserve the significant amount of memory required to maintain each active session and its backup replicated for resiliency. Sessions may be put into standby to save resources or migrated to different resources based on system considerations such as resource usage, resource failure, quality of service agreements and/or session idle time. Advantageously, the session distributed handling system 200 may support hundreds of millions of concurrent user sessions.

In some embodiments, various functional blocks 210, 220, 230 and 240 may be co-located in one apparatus.

In some embodiments, one or more of the functional blocks 210, 220, 230 and 240 may contain a plurality of functional elements. For example, the session data store 240 may be comprised of a plurality of data storage devices. In these embodiments, various functional blocks 210, 220, 230 and 240 may be distributed across multiple apparatus.

In some embodiments, session state data is formatted as a name-value pair where name identifies the session state variable and value represents the value of that session state variable.

In some embodiments, the session state data includes the session parameter(s) and at least one identifier representing the current node of the session within a state diagram representing the session flow. In these embodiments, the state diagram is defined in terms of state transitions between nodes in the state diagram and the session state.

In some embodiments, the state machine 230 identifies state using a graph with numbered vertices. In this embodiment, session state is the number of the vertex of the current session and stored variables required by the state machine 230.

In some embodiments, the session data store 240 may be distributed across a number of the state machines within state machine 230.

In some embodiments, the session states stored in session data store 240 may be stored in a primary data storage device and one or more standby data storage devices. In particular, upon receipt of an updated session state 250-7, the session data store 240 may update one or more data storage devices.

In some embodiments, the session data store 240 may use a conventional log file and/or checkpoints to maintain the integrity of the session data store.

In some embodiments, at least one of the applications 110 of FIG. 1 may be an LTE telecommunication application. In this embodiment, one of the messages may be an MME function. The MME is a session-oriented application where each session has its own data and access to a shared data structure (e.g., Tracking Areas). The MME function implements most of the 'intelligence' of an LTE wireless telecommunication network. The MME function authenticates user equipment (UE) accessing the system, manages UE state while the users are idle, supervises handovers between different base station controllers (eNB), establishes bearers as required for Internet (PDN) connectivity in a mobile context, generates billing information, implements lawful interception policies, as well as many more functions. In other embodiments, one of the messages may be PBX, AAA, HLR, SGSN, and other signaling functions which are highly available and have real-time guarantees.

Referring to FIGS. 4-7, one embodiment of the distributed message handling system 200 of FIG. 2 is illustrated implementing a basic H.248 call setup.

Figure 4:
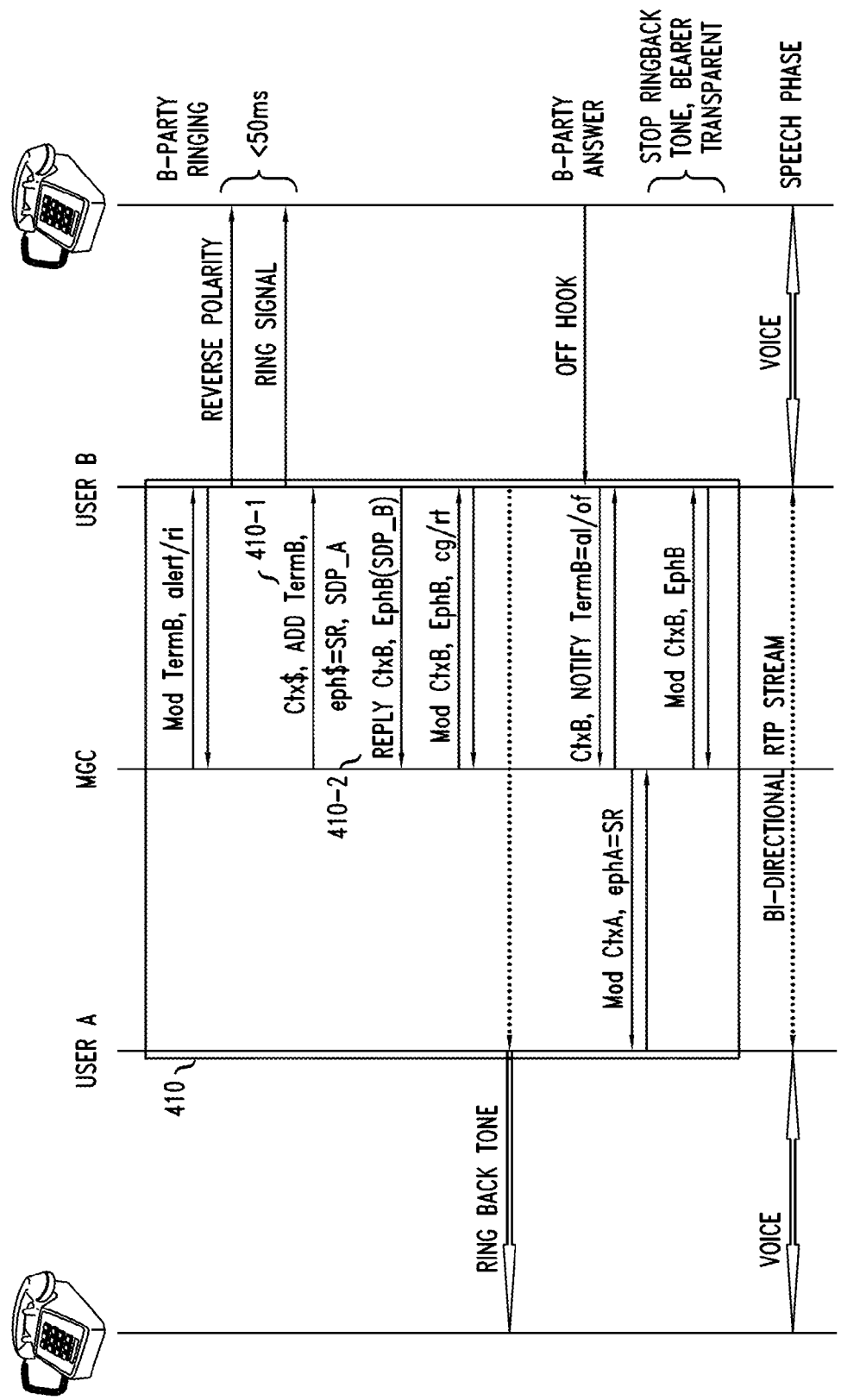
FIG. 4 illustrates an exemplary exchange of messages involved in a basic H.248 call setup.

FIG. 4 illustrates an exemplary exchange of messages 410 between User A and User B involved in a basic H.248 call setup. In this embodiment, the Media Gateway Controller (MGC) may contain the functionality of the message handling system 200 of FIG. 2. For example, message 410-1 may contain the event data to initiate a connection between User A and called party User B. Similarly, message 410-2 may contain the event data for User B to specify the communication parameters to be used.

Figure 5:
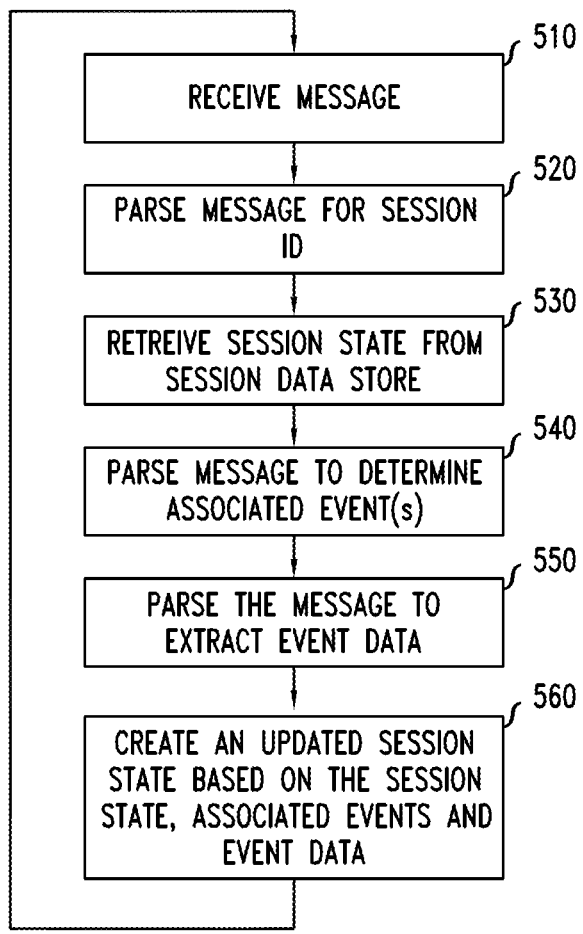
FIG. 5 shows a flow diagram illustrating an embodiment for translating messages into session state as illustrated in the functional blocks of FIG. 2.

FIG. 5 shows a flow diagram of a method 500 for translating messages into session state as illustrated in the functional blocks of FIG. 2. The method 500 includes receiving a message (step 510), parsing the message to extract a session id (step 520), retrieving session state from a session data store (step 530), parsing the message to determine the associated event (step 540), parsing the message to extract event parameter(s) (step 550) and create an updated session state based on the session state, associated events and event data (step 560).

In the method 500, the step 510 includes receiving a message. In some embodiments, the message may be an H.248 message. For example, one embodiment of message 410-1 in FIG. 4 may be as illustrated by lines (1)-(20) of FIG. 6. Similarly, one embodiment of message 410-2 may be as illustrated as lines (21)-(40) of FIG. 7.

In the method 500, the step 520 includes parsing the message for a session id. For example, referring to FIG. 6, the session id may be parsed from message 410-1. In particular, the IP address/port number tuple of line 1 and/or the transaction identifier of line 2 may be extracted from the message to determine a session id.

In the method 500, the step 530 includes receiving the session state from a session data store as described above in FIGS. 1-3. In some embodiments, the session state may be represented by a collection of name-value pairs representing the relevant data defining the session context as in FIG. 8 which illustrates an exemplary segment of data defining the session state.

In the method 500, the step 540 includes parsing the message to determine the associated event. For example, referring to lines 3-17 of FIG. 6, the first event is to create a new context and add the physical termination TermA into it. The second event is to create an ephemeral termination and add the created termination in the same context that was created by the earlier event.

In the method 500, the step 550 includes parsing the message to determine the event parameter(s). For example, referring to the examples in FIGS. 6 and 7 illustrating one embodiment of messages 410-1 and 410-2 respectively, the connection fields IP address and the media field port number are unspecified in the message in FIG. 6. By parsing the response in FIG. 7, the IPAddress and port number may be determined. In particular, lines 32 and 33 identify the allocated IP address (i.e., 209.110.59.33) and port number (i.e., 30000) to be used in this example.

In the method 500, the step 560 includes creating an updated session state based on the session state, associated events and event data. In particular, the parameters extracted from the event data and/or associated with the associated events may be used to modify the current session state and/or session parameters in the received session state. The session parameters may be modified by adding parameters and/or updating session parameters already present in the received session state with new values. It should be appreciated that based on whether any associated events and/or event data is extracted and/or relevant, the updated session state may be the same as the retrieved session state or the updated session state may be the retrieved session state modified by the associated events and/or event data.

In some embodiments, the parsing of the message in steps 520, 540 and/or 550 may use a context sensitive rule. The rule may be sensitive to the context of the place of the token. For example, as illustrated in line 1 of FIG. 6, the ip address/port tuple may be located in the first line following the "MEGACO" message protocol identifier.

In some embodiments, the method 300 and/or 500 may also include executing the received message using a flow definition. A flow definition, or finite state automata, describes the nodes, edges and logic of the associated state diagram. The retrieved session state, associated events, and event data may be used as inputs into the flow definition. The flow definition output may generate transactions. For example, transactions may be messages to initiate ringing, ringback or an RTP communication stream as illustrated in FIG. 4. Similarly, flow definition output may update the session context. For example, ip addresses and ports may be associated with the calling or called party in a name-value pair such as: "CALLED PARTY IPADDRESS", "209.110.59.33". The term "state diagram" as used herein should be understood broadly as also including "flow diagrams", programmed subroutines enacting the flow diagram logic or any other programming technique directed to processing received messages in a state system.

In some embodiments, of the method 300 and/or 500 may further include updating the retrieved session state to reflect the associated events, actions taken in response to the associated events and/or the retrieved event data. For example, name-value pairs may be created reflecting the retrieved associated events, actions taken in response to the associated events and/or the retrieved event data. The retrieved session state may then be updated to reflect the created name-value pairs and stored in the session data store.

It should be appreciated that conventional database techniques may be used to update the session data store. Moreover, it should be appreciated that the entire updated session state need not be uploaded to the session data store. For example, in some embodiments, query(s) may be formed for creating new name-value pairs and/or updating modified name-value pairs to reflect the updated session state.

In some embodiments, the method 300 and/or 500 may further include migrating the session state between executing entities. Advantageously, migrating the session state typically requires less memory than moving an entire VM so it can be done quickly. Moreover, since the form of the state is independent of the architecture of the machine, the session state is capable of being migrated between disparate hardware such as: from a server to a smart phone or from a set top to a server.

In some embodiments, the method 300 and/or 500 may further include recreating the sequence of received messages based on the retrieved session state and the flow definition. In particular, the current node of the state diagram may be determined from stored data (e.g., a name-value pair) within the session state. The current node may then be used as a starting point within the flow definition to traverse the flow from the current node to an initial node. Each successive node in the sequence may be determined by determining the possible paths leading to target node and selecting the traversed path from the possible paths based on the session state data. Once a successive node is determined, the message from the successive node to the target node may be recreated using the known message format stored in the flow definition and the session data corresponding to the event data contained in the message format.

Referring back to FIG. 8, FIG. 8 illustrates one embodiment of the session state retrieved in step 320 of FIG. 3 and in step 530 of FIG. 5. The session state includes a session id, an indicator of the current state of the session and session parameters.

In line (1), the "|" is a file delimiter indicating the start of a new session id or session context; the indicator "C4" and "Cxt: 4' are both session identifiers indicating that the session data is for session id 4 (e.g., context 4); the indicator "NTFY(1)" indicates the current state of the session (e.g., NOTIFY 1). The name value list (NVL) is then listed in lines (2)-(26) which have been redacted from the full list for clarity. The NVL includes the session parameters extracted from prior messages and/or instantiated by a prior state machine. For example, line (8) illustrates a stored string of dialed digits extracted from a previous message.

In some embodiments, the session state will include a history of session parameters that are not needed for the current state. The stored history may be used to recreate the sequence of received messages as described above. For example, lines (14)-(21) represent the session description protocol (SDP) proposed by one client and lines (22)-(29) represent the SDP agreed upon by the other client. Though only the agreed SDP is active in the communication, the proposed SDP may be used to recreate the original proposal message.

It should be appreciated that FIG. 8 is a portion of a "verbose" listing of a stored session state and that retrieval of the entire session state is not required. In some embodiments, only the relevant session state data is retrieved. In particular, only the subset of session parameters (e.g name-value pairs) are retrieved. The retrieved subset may include only those session parameters that are required by the state machine for the current state of the session.

Although primarily depicted and described in a particular sequence, it should be appreciated that the steps shown in methods 300 and 500 may be performed in any suitable sequence. Moreover, the steps identified by one box may also be performed in more than one place in the sequence.

It should be appreciated that steps of various above-described methods can be performed by programmed computers. Herein, some embodiments are also intended to cover program storage devices, e.g., data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable data storage media. The embodiments are also intended to cover computers programmed to perform said steps of the above-described methods.

Figure 9:
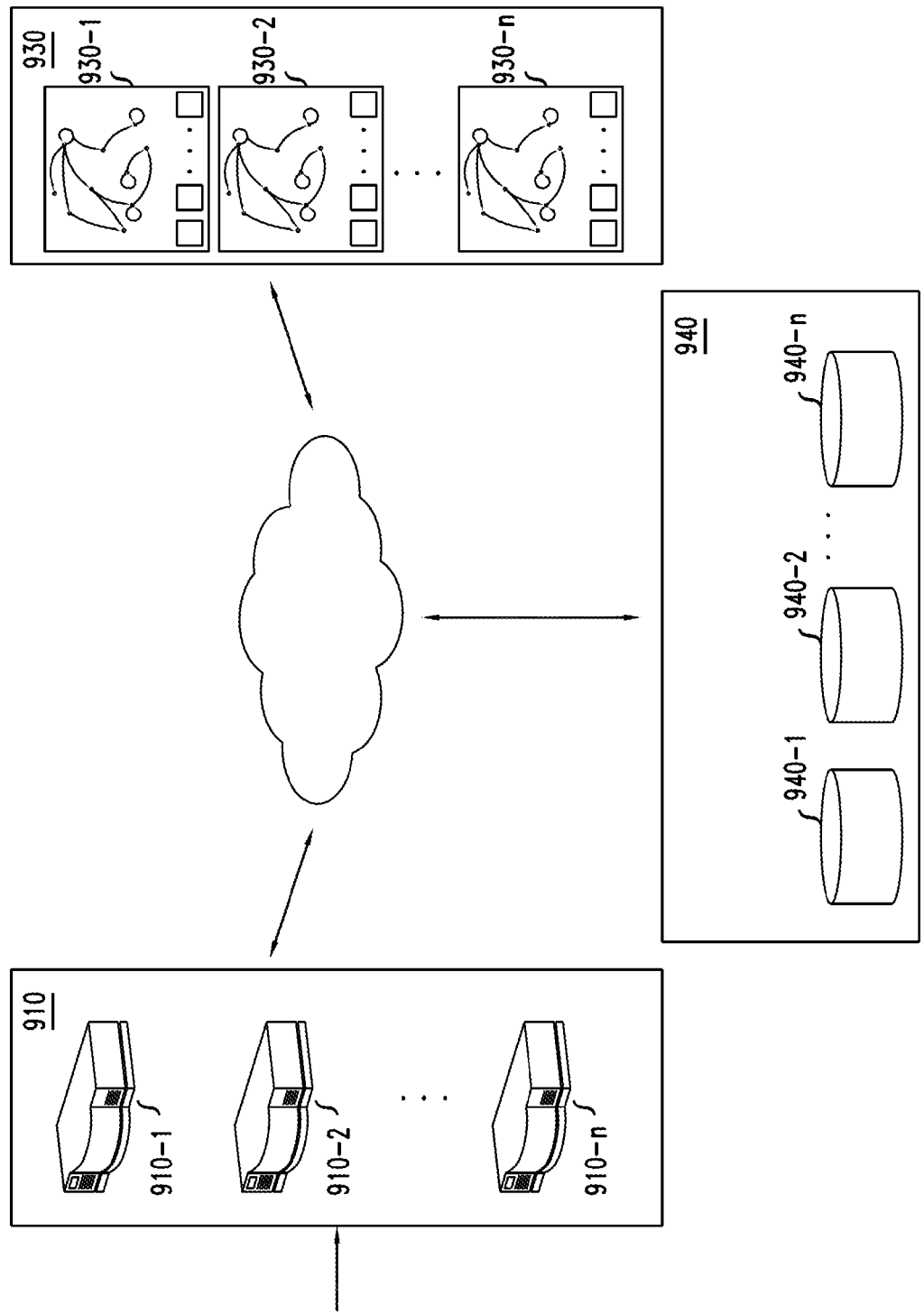
FIG. 9 depicts a block diagram schematically illustrating a first embodiment of a distributed message handling system 100.

FIG. 9 depicts a block diagram schematically illustrating a first embodiment of a distributed message handling system 100. The distributed message handling system 100 includes one or more anchor points 910-1-910-n (collectively anchor points 910) which forwards received messages to one or more state machines 930-1-930-n (collectively state machines 930). The distributed message handling system 100 also includes one or more session data stores 940-1-940-n (collectively session data stores 940)

The anchor points 910 routes incoming messages to a state machine 930-1-930-n. In particular, the anchor point receives the message from the network and performs the functions of the session router 210 of FIG. 2. In this embodiment, an incoming message is always dispatched to the same state machine 930-1-930-n, i.e. the user sessions are sticky. The anchor point receiving the message from the user endpoint ("UE") associates the UE and the target state machine 930-1-930-n.

The state machines 930 perform the functions of the session manager 220 of FIG. 2 as well as of the state machine 230 of FIG. 2. In particular, a state machine (e.g., 930-1) is assigned to a session (e.g., 120-1 of FIG. 1). That assigned state machine is the only one to know about the up-to-date session contexts supported by that instance. It should be appreciated that the state machines 930 may reply directly to end user without traversing the anchor points 910.

The session data stores 940 perform the functions of the session data store 240 of FIG. 2. In particular, one of more of the session data stores 940-1-940-n, may be resident on a separate data storage device.

In some embodiments, the anchor point 910 keeps a table of the assignments between UE (user endpoint) and target state machine.

In some embodiments, the anchor point 910 hashes the request to match it with an associated state machine.

In some embodiments, the anchor point 910 is replicated using conventional replication techniques such as active-active and/or hot-standby.

In some embodiments, a state machine (e.g., 930-1) within state machines 930 is replicated. In a further embodiment, the replicated state machine is replicated using conventional active-active replication techniques, e.g., the replicated state machine is replicated on at least one partner machine.

For example, there may be one primary state machine (e.g., 930-1) for each session (e.g., 120-1 of FIG. 1). The primary state machine may then be associated with one or more secondary state machines (e.g., 930-2). The primary and secondary state machines can swap and push associated session states as long as they update the anchors points 910, e.g., associated anchor point, e.g., 910-1. For example, referring to FIGS. 2 and 5, a state machine 930-1 may execute translated session context 250-5 creating an updated session context, translate the updated session context into an updated session state 250-7, and copy the updated session state 250-7 onto the standby state machine.

In table 1 below, instances, primary sessions and standby sessions are shown in relation to FIG. 1. Sessions for instance 120-2 are 130-2(1)-130-2(n) (not shown in FIG. 1).

TABLE 1

Example of Instance Backup

| Instance | Primary Session | Standby Session |
|---|---|---|
| 120-1 | 130-1(1) | 130-2(1) |
| 120-2 | 130-2(1) | 130-1(1) |

In some embodiments, the session data stores 940 store session state using conventional data backup techniques to provide high reliability. Advantageously, since the session data stores 940 are storing the session state capable of reconstructing the session context for the sessions, the anchor points 910 and/or state machines 930 do not need to be highly reliable and may be commodity components.

In some embodiments, distributed message handling system 100 stores session state checkpoints in the session data stores 940. This session data store may be designed as a conventional 1-hop DHT such as described in G. DeCandia, D. Hastorum, M. Jampani, G. Kakulapati, A. Lakshman, A. Pilchin, S. Sivasubramanian, P. Vosshall, and W. Vogels, "Dynamo: Amazon's Highly Available key-value Store," Proc. 21st ACM Symp. Operating Systems Principles (SOSP '07), pp. 205-220, October 2007 and incorporated herein by reference. In a further embodiment, the session data store may be a key-value store where key is the session identifier and value is the session state. Advantageously, in cases where the network gets partitioned, or an entire datacenter goes offline, these embodiments further increase availability. In some embodiments, resources running a state machine may participate in this session data store or other cloud resources can be attributed to it.

Figure 10:
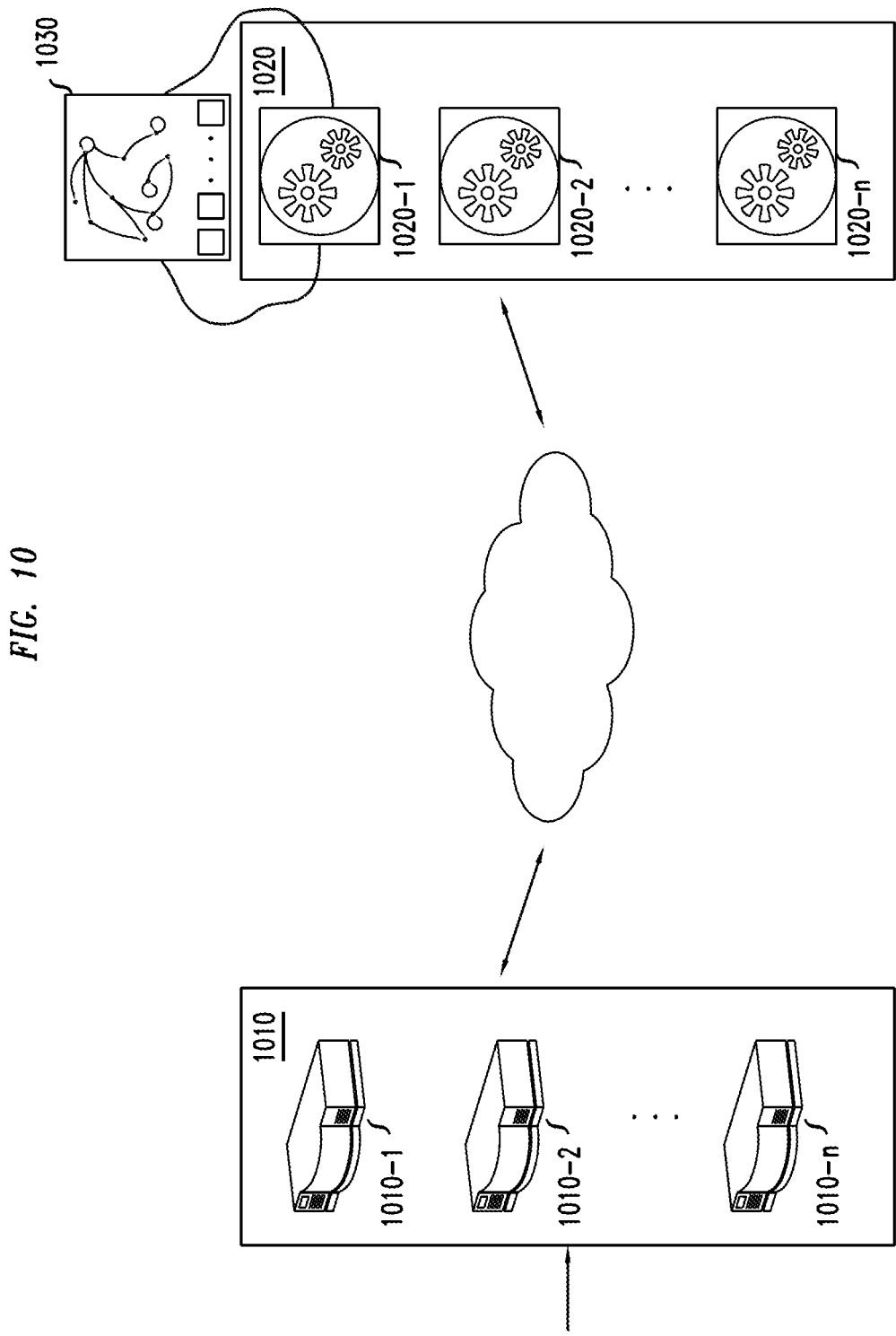
FIG. 10 depicts a block diagram schematically illustrating a second embodiment of a distributed message handling system 100.

FIG. 10 depicts a block diagram schematically illustrating a second embodiment of a distributed message handling system 100. The distributed message handling system 100 includes one or more anchor points 1010-1-1010-n (collectively anchor points 1010) which forwards received messages to one or more worker instances 1020-1-1020-n (collectively worker instances 1020). Worker instances open a state machine 1030 to execute a received message.

The anchor points 1010 randomly routes incoming messages to a worker instance 1020-1-1020-n. In this embodiment, session router functionality is not included in the anchor points 1010, creating less complex anchor points 1010 that do not require mapping logic. In particular, the anchor points 1010 track the running worker instances 1020 and randomly dispatches incoming messages. Advantageously, if an anchor point becomes unavailable, the distributed message handling system 100 simply sends the message to another known anchor point for routing to a worker instance. Moreover, because the anchor points 1010 do not keep state, they do not need to be replicated.

The worker instances 1020 perform the functions of the session router 210 of FIG. 2, session manager 220 of FIG. 2, the state machine 230 of FIG. 2, and the session data store 240 of FIG. 2. In particular, a worker instance, e.g., 1020-1, is a state machine and contains a fraction of the session data store.

In some embodiments, anchor points 1010 route LTE protocols such as S1, S6, S10, S11.

In some embodiments, a worker instance, e.g., 1020-1, receives a message from the anchor points 1010 and determines whether it has the session state information for the message. If worker instance 1020-1 has the session state information, worker instance 1020-1 starts the state machine 1030 and executes the message as described herein. If the worker instance does not contain the session state information for the message, the worker instance forwards the message to another worker instance with the session state. The worker instance may map the session id to a worker instance as described above in regard to session router 210. For example, the worker instance may map the session id or use a random forwarding or next hop technique.

In some embodiments, worker instances 1020 are replicated. In this embodiment, at least a portion of the fraction of the session data store within a primary worker instance 1020-1-1020-n is replicated on a secondary worker instance 1020-1-1020-n. In a further embodiment, worker instances 1020 are networked and neighbors are secondary stores. In these embodiments, when a primary worker instance goes down, secondary worker instances may service incoming messages.

In some embodiments, worker instances 1020 may start a state machine 1030 when a message is received and delete the created state machine after the message is serviced.

In some embodiments, at least one of the applications 110 of FIG. 1 may be an LTE telecommunication application. In this embodiment, one of the messages may be an MME function. In this embodiment, workers instances 1020 include MME state machine logic and a replicated data-store (e.g., 1-hop DHT) that combined contains all the information required to construct the session context. In this embodiment, a worker instance receives a message including a session id identifying from which UE the message was sent, retrieves the session state from its replicated data-store, initiates a state machine to process the message, stores the updated session state in its replicated data-store and if necessary, sends out a message back to the UE or to another component within the LTE network.

Figure 11:
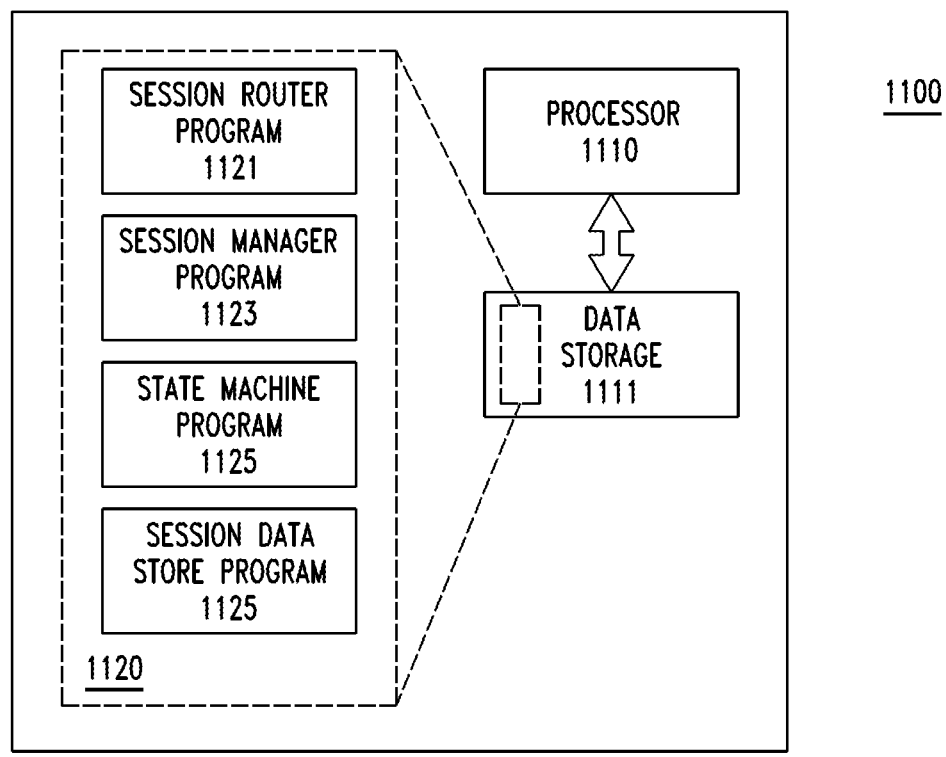
FIG. 11 schematically illustrates blocks of one embodiment of various devices of FIGS. 1-10.

FIG. 11 schematically illustrates one embodiment of various devices 1100 such as session router 210, session manager 220, state machine 230 and/or session data store 240 of FIG. 2; anchor points 910, state machines 930 and/or session data stores 940 of FIG. 9; and/or anchor points 1010, and/or worker instances 1020 of FIG. 10. These various devices 1100 may perform the functions described herein, e.g., using the methods 300 and/or 500. The various devices 1100 include a processor 1110 and a data storage 1111.

The processor 1110 controls the operation of the various devices 1100. The processor 1110 cooperates with the data storage 1111.

The data storage 1111 may store the session data (e.g., session data store 240 in FIG. 2; session data store 940 in FIG. 9 and worker instances 1020 in FIG. 10) and state machine logic (e.g., state machine 230 in FIG. 2; state machine 930 in FIG. 9 and worker instances 1020 in FIG. 10). The data storage 1111 also stores programs 1120 executable by the processor 1110.

The processor-executable programs 1120 may include a session router program 1110, a session manager program 1123, a state machine program 1125 and/or a session data store program 1127. Processor 1110 cooperates with processor-executable programs 1120 to implement the functionality described in FIGS. 1-10 and/or perform the steps of methods 300 and/or 500. It should be appreciated that the exemplary processor-executable programs 1121, 1123, 1125 and 1127 may be optional depending on the function of the device (e.g., data session store program 1127 is not required to implement the session router 210 of FIG. 2).

When processor-executable programs 1120 are implemented on a processor 1110, the program code segments combine with the processor to provide a unique device that operates analogously to specific logic circuits.

Although depicted and described herein with respect to embodiments in which, for example, programs and logic are stored within the data storage and the memory is communicatively connected to the processor, it should be appreciated that such information may be stored in any other suitable manner (e.g., using any suitable number of memories, storages or databases); using any suitable arrangement of memories, storages or databases communicatively coupled to any suitable arrangement of devices; storing information in any suitable combination of memory(s), storage(s) and/or internal or external database(s); or using any suitable number of accessible external memories, storages or databases. As such, the term data storage referred to herein is meant to encompass all suitable combinations of memory(s), storage(s), and database(s).

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the FIGs., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated that any block diagrams herein represent conceptual views of illustrative circuitry embodying the principles of the invention. Similarly, it should be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. A distributed message handling apparatus, comprising:
a data storage; and
a processor communicatively coupled to the data storage, the processor configured to:
retrieve a session state representing an initial session context based on a session id of a received message;
extract an event parameter from the received message, the event parameter associated with a session parameter relevant to the session state;
create a session context based on the session state and the session parameter;
execute the session context; and
create an updated session state based on the executed session context;
wherein the initial session context is different from the session context being executed; and
wherein the data storage comprises the updated session state associated with the state machine and a secondary session state associated with a second state machine of a second distributed message handling apparatus.

2. The apparatus of claim 1, wherein the session state comprises a session id, a plurality of session parameters and a current node identifier.

3. The apparatus of claim 2, wherein at least a portion of the plurality of session parameters are formatted as name-value pairs.

4. The apparatus of claim 2, wherein the processor is further configured to:
retrieve a second session state based on a second session id of a received message; and
recreate a sequence of messages for the second session id based on the second session state and a flow definition.

5. The apparatus of claim 1, wherein the processor is further configured to:
transmit the updated session state to the second distributed message handling apparatus; and
receive the secondary session state from the second distributed message handling apparatus.

6. The apparatus of claim 1, wherein the received message is a call setup message.

7. The apparatus of claim 1, wherein a first session parameter associated with the session state is updated based on the session parameter; and wherein the session parameter in the initial session context has a different value than the session parameter in the session context.

8. The apparatus of claim 1, wherein the initial session context does not include the session parameter, and wherein the session context includes the session parameter.

9. The apparatus of claim 1, wherein the event parameter is a connection fields IP address.

10. The apparatus of claim 1, wherein the processor is further configured to:
receive a second message;
forward the received message to a second distributed message handling apparatus based on a second determination that the apparatus does not contain a second session context associated with the second message;
wherein the retrieval of the session state is based on a first determination that the apparatus contains the session context.

11. The apparatus of claim 1, wherein the message is a call setup message.

12. A distributed message handling apparatus in a distributed message handling system, the distributed message handling apparatus, comprising:
a data storage, the data storage comprising a session data store; and
a processor communicatively coupled to the data storage, the processor configured to:
receive a plurality of messages;
forward at least a first message of the plurality of messages to a second distributed message handling apparatus in the distributed message handling system; and
process at least a second message of the plurality of messages, the process comprising the processor configured to:
retrieve a session state representing an initial session context from the session data store based on the second message;
extract an event parameter from the received message, the event parameter associated with a session parameter relevant to the session state;
create a session context based on the session state and the session parameter;
execute the session context;
create an updated session state based on the executed session context; and
store the updated session state in the data storage;
wherein the initial session context is different from the session context being executed; and
wherein the data storage comprises the updated session state associated with the state machine and a secondary session state associated with a second state machine of a second distributed message handling apparatus.

13. The apparatus of claim 12, wherein the session state comprises a session id, a plurality of session parameters and a current node identifier.

14. The apparatus of claim 12, wherein at least the first message and the second message include a session id.

15. The apparatus of claim 14, wherein the processor is further configured to:
determine whether the session data store contains session state information for the message based on the session id;
wherein a determination to forward the first message and a determination to process the second message are based on the determination of whether the session data store contains session state information for the message.

16. The apparatus of claim 15, wherein the processor is further configured to:
start the state machine in response to determining to process the second message.

17. The apparatus of claim 12, wherein the processor is further configured to:
receive a migrated session state from a third distributed message handling apparatus in the distributed message handling system; and
update the session data store based on the migrated session state.

18. The apparatus of claim 12, wherein the state machine comprises a flow definition.

19. A method for handling a received message in a distributed message handling system, comprising:
at a processor communicatively coupled to a data storage, retrieving a session state representing an initial session context based on a session id of the received message;
extracting, by the processor in cooperation with the data storage, an event parameter from the received message, the event parameter associated with a session parameter relevant to the session state;

creating, by the processor in cooperation with the data storage, a session context based on the session state state and the session parameter;

executing, by the processor in cooperation with the data storage, the session context; and creating, by the processor in cooperation with the data storage, an updated session state based on the executed session context;

wherein the initial session context is different from the session context being executed; and wherein the data storage comprises the updated session state associated with the state machine and a secondary session state associated with a second state machine of a second distributed message handling apparatus.

20. The method of claim 19, wherein act of creating the session context comprises:

translating, by the processor in cooperation with the data storage, an updated session state using an updated session context created by the state machine; and transmitting, by the processor in cooperation with the data storage, the updated session state to a session data store.

21. The method of claim 19, wherein the session state comprises a session id, a plurality of session parameters and a current node identifier.

* * * * *